United States Patent Office 3,154,921
Patented Nov. 3, 1964

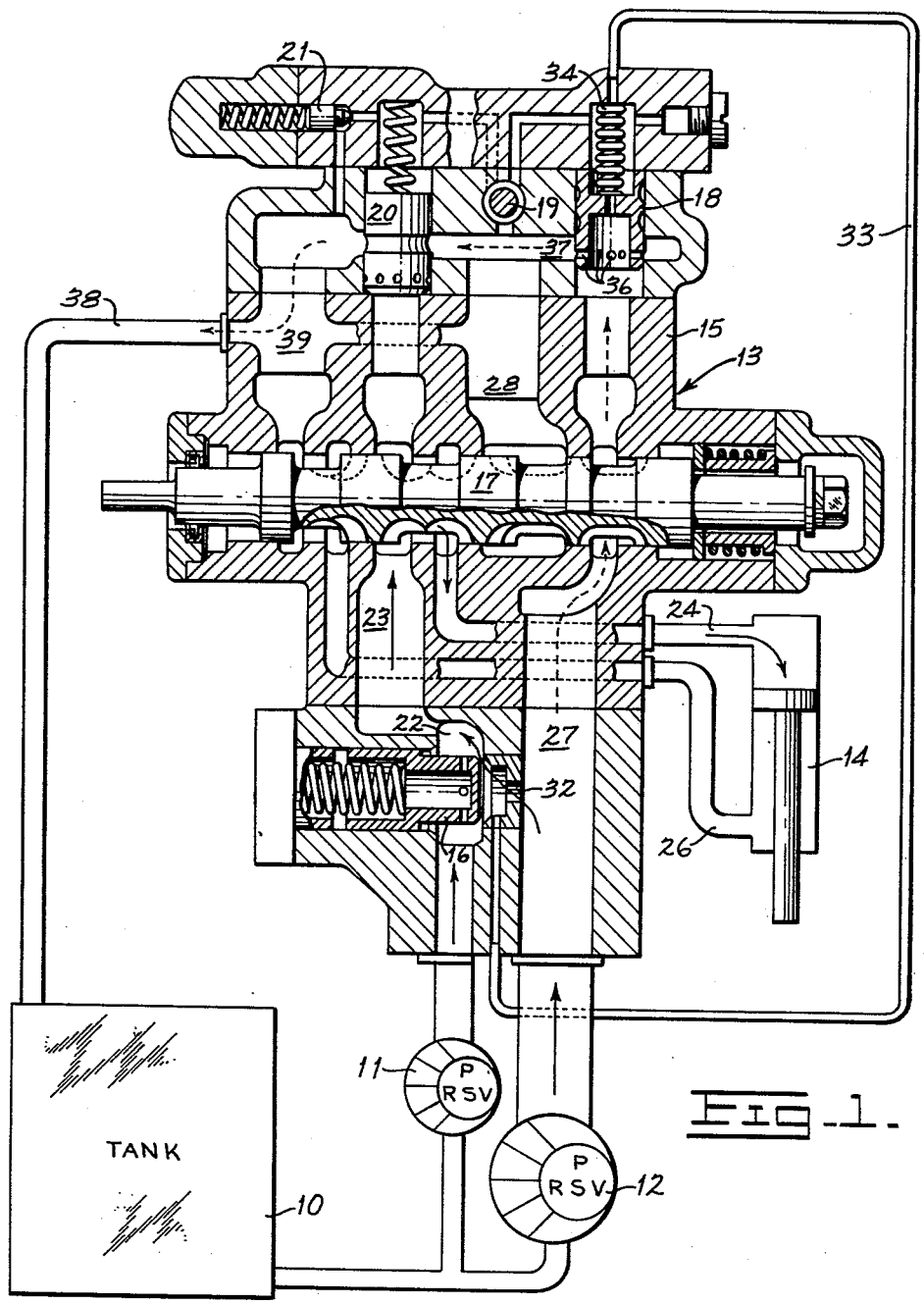

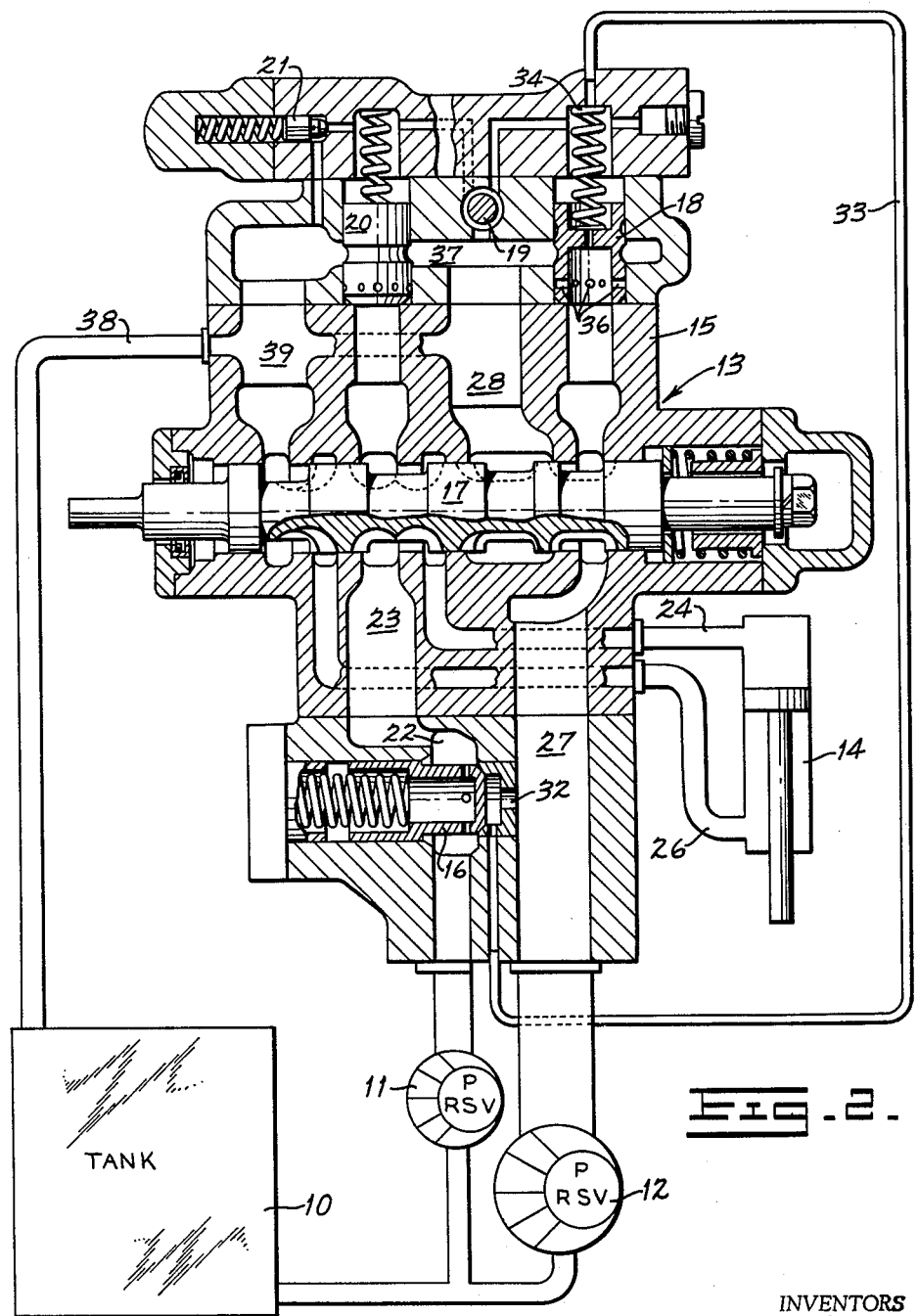

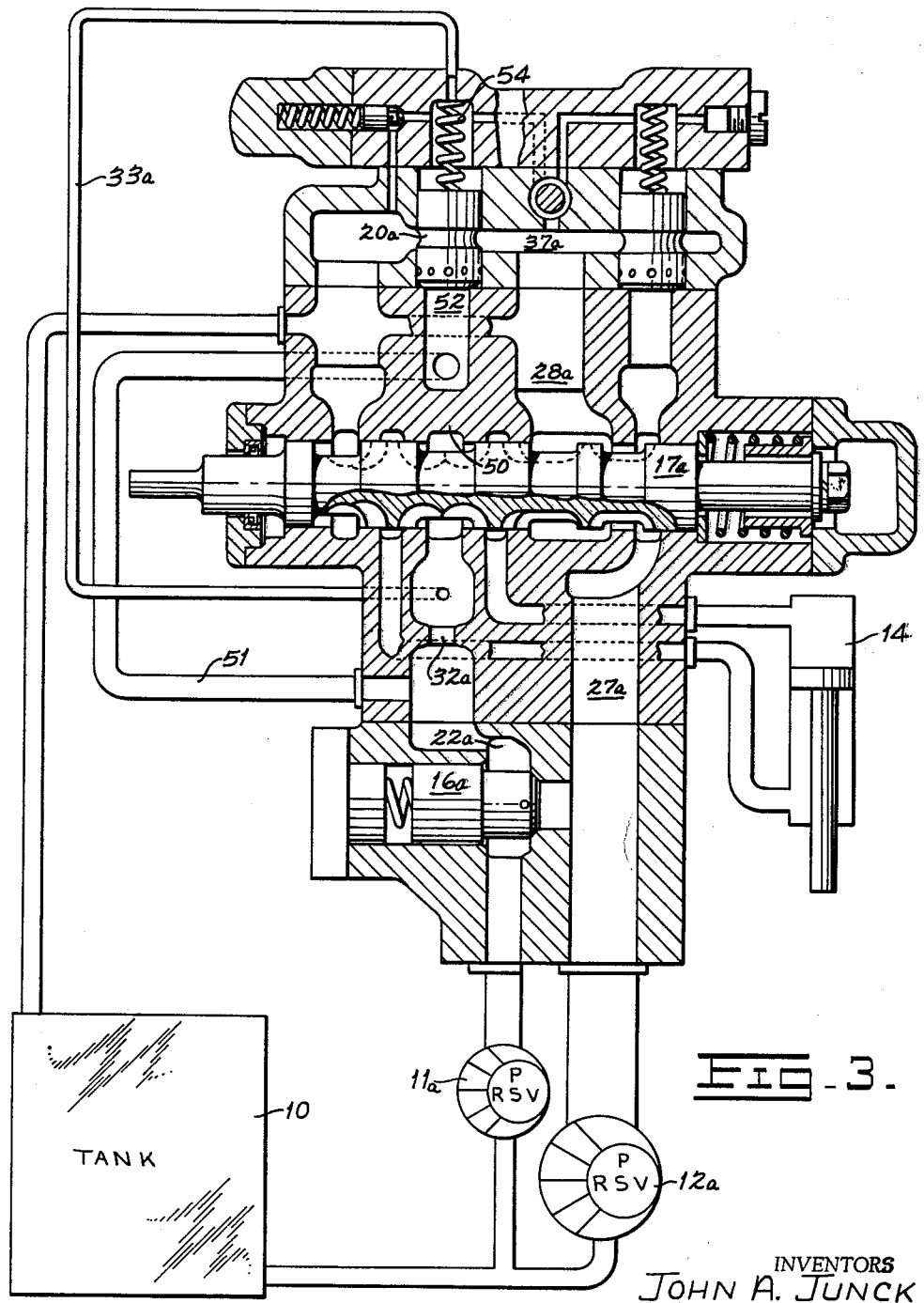

3,154,921
FLUID PRESSURE SYSTEM AND CONTROL
John A. Junck and James E. Scheidt, Joliet, Ill., assignors to Caterpillar Tractor Co., Peoria, Ill., a corporation of California
Filed Jan. 19, 1962, Ser. No. 167,273
2 Claims. (Cl. 60—52)

This invention relates to fluid pressure systems which employ two positive displacement pumps of different volumetric capacities and particularly to fluid flow and pressure control means therefor.

The invention is particularly adaptable to and may best be understood in connection with its use in hydraulic steering mechanisms of the kind found on large tractors and the like. These steering systems generally employ two pumps of different volumetric capacities. When it is desired to execute a turn at a slow rate of speed the pump of relatively low volumetric capacity is employed to supply the system with pressure. On the other hand, when it is desired to execute a turn at a fast rate of speed the pump of greater volumetric capacity is allowed to act upon the system, along with the smaller pump, to provide a corresponding fast response. In hydraulic steering systems used on large tractors and the like the rate of movement of the steering jacks or servomotors is normally directly related to the speed of the hydraulic pumps supplying pressure to the system. Since these pumps are driven by the vehicle engine it is required that the maximum output of the pumps at high idle engine speed be sufficiently low to prevent excessive steering speeds. This has the undesirable result, however, of producing low speed steering when the vehicle engine is operating at lower speeds, even in the fast turn position. Thus when the vehicle is operated in dangerous areas, such as along the edge of the fill or a cliff where rapid steering response is needed, sluggish steering is generally experienced as the speed of the vehicle engine is normally low when working in such areas.

Accordingly, it is an object of the present invention to provide a fluid system employing two positive displacement pumps of different volumetric capacities which provides a substantially constant volume of fluid when both pumps are joined in operation, regardless of engine speed.

Further and more specific objects and advantages of the invention are made apparent in the following specification wherein a preferred form of the invention is described by reference to the accompanying drawings.

In the drawings:

FIG. 1 is a schematic view of the fluid pressure system showing a servomotor in a partially extended position and a cross section view of the control valve unit showing the selector valve spool in a fast turn position;

FIG. 2 is a view similar to FIG. 1 wherein the selector valve spool is in a slow turn position; and FIG. 3 is an alternate embodiment shown similar to the embodiment of FIG. 1.

In FIG. 1 the fluid pressure system is shown as comprising a reservoir tank 10 as a source of fluid supply, two rotary sliding vane pumps including a small pump 11 and a larger pump 12, a control valve unit 13, a fluid pressure operated servomotor 14, and suitable fluid transmitting conduits connecting these elements.

The control valve unit 13 includes a valve body 15, a flow combining check valve 16, a flow directing selector valve spool 17, an unloading valve 18 in the pressure circuit of the larger pump 12, a pressure controlled pilot valve 19, a pilot operated relief valve dump spool 20 in the circuit of the smaller pump 11, and a pilot valve 21 controlling the opening of the dump spool 20.

The selector valve 17 is provided with a plurality of lands which cooperate with a plurality of recesses formed in the bore of the valve body 15 to effect the desired direction of the fluid. With valve spool 17 in the fast turn position, as shown in FIG. 1, fluid from pump 11 passes from annular recess 22 to channel 23 where it is directed by spool 17 to conduit 24 communicating with servomotor 14. Valve spool 17 also has a fast turn position (with the spool positioned to the extreme left) which communicates channel 23 with conduit 26 leading to the other side of servomotor 14. When fluid is directed to conduit 24 the servomotor is extended while fluid to conduit 26 induces retraction. In both of the fast turn positions of valve spool 17 communication between passages 27 and 28 is blocked to prevent the output of pump 12 from returning to tank 10. This creates a pressure rise in passage 27 sufficient to open check valve 16 and permit a predetermined amount of fluid to flow through an orifice 32 and recess 22 from pump 12 to supplement the fluid from pump 11 in positioning servomotor 14.

Pump 12 is of sufficient capacity to provide a greater volume of fluid than is necessary to provide a constant flow of delivery through orifice 32 even at low idle speeds. This assures that a constant amount of fluid is directed to the steering system at all vehicle speeds. To eliminate the adverse effects of the back pressure from the excess fluid from the pump, the invention provides a conduit 33 which communicates the downstream side of orifice 32 with one side of check valve 18. In this way the output pressure of pump 12 is applied against one face of valve 18 urging it to an open position, while the pressure at the downstream side of orifice 32 is applied against the other face of valve 18 urging it to a closed position. When the high volume pump 12 is operated at a speed which produces a flow of fluid therefrom equal to or less than the amount of fluid which orifice 32 can pass, the fluid forces acting on either side of valve 18 will be equal and spring 34 urging valve 18 to a closed position will control. When pump 12, however, starts pumping fluid at a greater rate than can pass through orifice 32 (normal operation), a pressure drop will exist across the orifice resulting in a greater pressure urging valve 18 open than urging it closed. When valve 18 is in its open position, as shown in FIG. 1, fluid from pump 12 is able to flow through a plurality of radial ports 36 to a passage 37 leading to a source return conduit 38 through channel 39. In this manner the excess output from pump 12 is dumped, preventing the undesirable build-up of back pressure, while a constant fluid supply is furnished to servomotor 14.

As shown in FIG. 2, when valve spool 17 is in a slow turn position passageway 27 communicates with passage 28 which, in turn, communicates with channel 39 leading to return conduit 38. Thus the output from pump 12 is continually dumped or returned to the source preventing sufficient pressure to build up in passage 27 to open check valve 16. Thus pump 11 is the sole source of working fluid to servomotor 14 wtih the valve spool in this position. When spool 17 is in a neutral position passage 27 communicates with passage 28 to again direct the output of pump 12 to tank 10 without requiring flow through orifice 32. From the foregoing description it becomes apparent that the output of pump 12 is directed through the orifice 32 only when spool 17 is in the fast turn positions to thereby eliminate the energy loss which would be created by a continuous operating flow control mechanism.

While the system described above has a substantially constant flow delivery at high turning speeds, there is a possibility of minor fluctuations in the fluid flow due to variation of the output of the smaller pump 11 with varying engine speeds. In practice these minor flow variations generally do not present a problem and can be safely ignored. When, however, a system is of such a nature that it requires a truly constant flow delivery, a modification of the system of FIG. 1, as shown in FIG. 3, will provide such a system. A large capacity pump 12a delivers fluid to a chamber 27a. Chamber 27a is separated from a chamber 22a by a check valve 16a and a dump or return path by valve spool 17a under certain conditions. When the valve spool is in the neutral position (as shown in FIG. 3) or the slow turn position, fluid delivered to chamber 27a is free to pass spool 17a to a source return path. When valve spool 17a is in one of the fast turn positions, however, fluid cannot pass the spool and pressure builds up in chamber 27a so as to position check valve 16a to the right and thereby provide communication between chamber 22a and chamber 27a.

A small capacity pump 11a delivers its output to chamber 22a where it combines with the fluid from pump 12a when spool 17a is in one of the fast turn positions. The fluid in chamber 22a flows past a restrictive orifice 32a before being directed to the servomotor 14. Thus, in this embodiment of the invention the outputs from the two pumps are combined prior to either of them being exposed to a restrictive orifice, whereas in the embodiment of FIG. 1 they are combined after the output from the larger pump is exposed to a restrictive orifice. In this manner fluctuations in the output of the small pump will not cause variations in the quantity of fluid delivered to the servomotor. To provide means for dumping the excess fluid in chamber 22a a conduit 51 is provided to communicate chamber 22a with a chamber 52 which communicates with one side of a relief valve dump spool 20a. It is to be noted that a member 50 is necessary to prevent fluid flowing past orifice 32a from entering chamber 52. The downstream side of orifice 32a communicates with spring chamber 54 of spool 20a by means of conduit 33a. The pressure provided by the fluid in the spring chamber prevents the opening of spool 20a until a pressure drop is experienced across the orifice 32a, as explained with reference to FIG. 1 and orifice 32. When the spool is in neutral or a slow speed position, the output from pump 11a will be the only fluid to the servomotor and will generally be of sufficiently low volume to pass through orifice 32a unrestricted.

The operation of pilot valve 19, relief valve dump spool 20, pilot valve 21, and the other components shown but not described, has not been discussed as it does not directly affect the present invention. The operation of these portions of the system is discussed in detail in the patent to Coker No. 2,846,848, for "Fluid Pressure System and Control."

We claim:
1. In a fluid pressure control for a vehicle hydraulic steering system having at least one steering jack which operates to steer the vehicle at a rate determined by the pressure of the working fluid applied thereto, the combination comprising;
   a source of hydraulic working fluid;
   a first pump disposed to draw fluid from said source and deliver it to a first chamber;
   a second pump disposed to draw working fluid from said source and deliver it to a second chamber;
   check valve means disposed between the first and second chambers and operative to form communication therebetween in response to the pressure in the first chamber exceeding that in the second chamber by a predetermined amount;
   a third chamber in communication with the second chamber through a restrictive orifice;
   selector valve means communicating with the third chamber, the steering jack, and the first chamber;
   relief valve means hydraulically disposed between said selector valve means and said source;
   said selector valve means having one position in which the third chamber communicates with the steering jack and the first chamber communicates with said relief valve whereby the pressure in said first chamber is prevented from building up and opening said check valve, such that only the fluid from said second pump is directed to the steering jack, resulting in a relatively slow vehicle steering rate;
   said selector valve having another position in which communication is established between the third chamber and the steering jack, and communication between the first chamber and said relief valve is blocked whereby pressure builds up in said first chamber causing said check valve to open and the output of said first pump to combine with that of said second pump in operating the steering jack, and thereby give rise to a relatively fast steering rate; and
   means responsive to a pressure drop across the orifice between the second and third chambers of a magnitude in excess of a predetermined value to relieve fluid from the second chamber and thereby maintain the steering pressure constant.

2. The fluid pressure control of claim 1 wherein said last named means comprises in combination;
   a spring closed relief valve hydraulically disposed between the second chamber and said source the pressure of the fluid in the second chamber operating against the spring and urging said valve to its open position in which fluid is relieved from the second chamber; and
   means communicating the third chamber with said relief valve in a manner causing the pressure in the third chamber to act with the spring and urge said relief valve to its closed position in which fluid cannot be relieved from the second chamber to said source, whereby said relief valve will open and relieve the pressure in the second chamber when the force of the pressure in the second chamber acting on said relief valve exceeds the force of the pressure in the third chamber acting on said relief valve plus the force of the valve spring.

References Cited in the file of this patent
UNITED STATES PATENTS

| | | |
|---|---|---|
| 2,545,856 | Orr | Mar. 20, 1951 |
| 2,549,897 | Evrell | Apr. 24, 1951 |
| 2,733,662 | Hunter | Feb. 7, 1956 |
| 2,835,323 | Booth | May 20, 1958 |
| 2,898,737 | Rockwell | Aug. 11, 1959 |
| 2,905,191 | Vander Kaay | Sept. 22, 1959 |
| 2,968,348 | Fortmann | Jan. 17, 1961 |
| 2,988,885 | Schnaible | June 20, 1961 |
| 3,033,277 | Cowles | May 8, 1962 |